United States Patent [19]

Konda

[11] Patent Number: 4,990,747
[45] Date of Patent: Feb. 5, 1991

[54] CERAMIC HEATING PLATE

[75] Inventor: Jiro Kondo, Kobe, Japan

[73] Assignee: Kabushiki Kaisha I.P.D., Japan

[21] Appl. No.: 267,432

[22] Filed: Nov. 4, 1988

[30] Foreign Application Priority Data

Nov. 5, 1987 [JP] Japan ............................ 62-169722[U]

[51] Int. Cl.$^5$ .............................................. H05B 3/24
[52] U.S. Cl. ..................................... 392/435; 165/904; 219/553
[58] Field of Search ............... 219/345, 354, 353, 357, 219/546, 553, 462, 464, 552; 165/49, 904; 126/64, 92 A, 92 AC, 92 B

[56] References Cited

U.S. PATENT DOCUMENTS

| | | | |
|---|---|---|---|
| 2,152,934 | 4/1939 | Trent | 219/354 |
| 3,453,413 | 7/1969 | Reynolds, Jr. | 219/345 |
| 3,541,305 | 11/1970 | Kuwayama et al. | 219/345 |
| 4,555,358 | 11/1985 | Matsushita et al. | 219/553 |
| 4,613,455 | 9/1986 | Suzuki et al. | 219/553 |
| 4,806,739 | 2/1989 | Kojima et al. | 219/345 |

FOREIGN PATENT DOCUMENTS

| | | | |
|---|---|---|---|
| 74748 | 3/1983 | European Pat. Off. | 219/345 |
| 211491 | 2/1987 | European Pat. Off. | 219/354 |
| 2624729 | 12/1977 | Fed. Rep. of Germany | 219/354 |
| 2490056 | 3/1982 | France | 219/345 |
| 51-34434 | 3/1976 | Japan | 219/354 |
| 55-21851 | 2/1980 | Japan | 219/354 |
| 213132 | 12/1983 | Japan | 219/345 |
| 110286 | 5/1987 | Japan | 219/354 |

Primary Examiner—Geoffrey S. Evans
Attorney, Agent, or Firm—Evenson, Wands, Edwards, Lenahan & McKeown

[57] ABSTRACT

A ceramic heating plate which comprises a planar body including a ceramic substratum covered with a far-infrared ceramic layer on the top surface; a heating sheet attached to the back surface of the substratum, the heating sheet including a pair of lead terminals through which the heating plate is connected to a source of power; and wherein the ceramic layer contains a single layer of ceramic particles exposed above the surface thereof so that far-infrared rays are radiated outside directly therefrom.

3 Claims, 2 Drawing Sheets

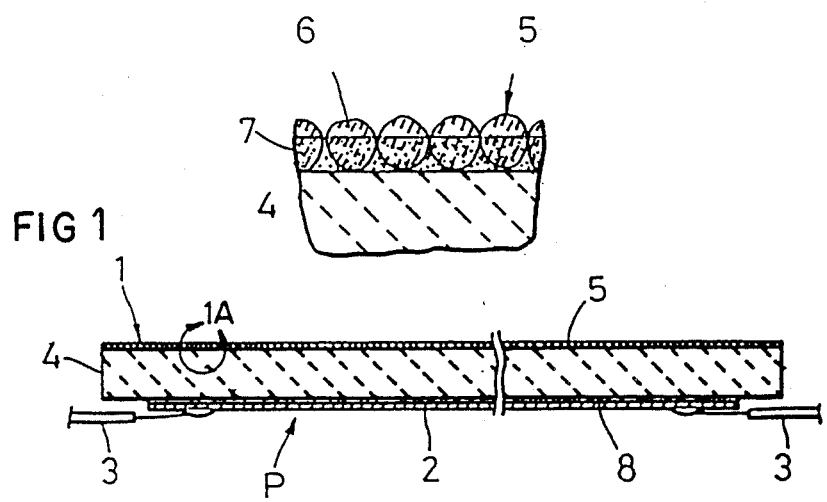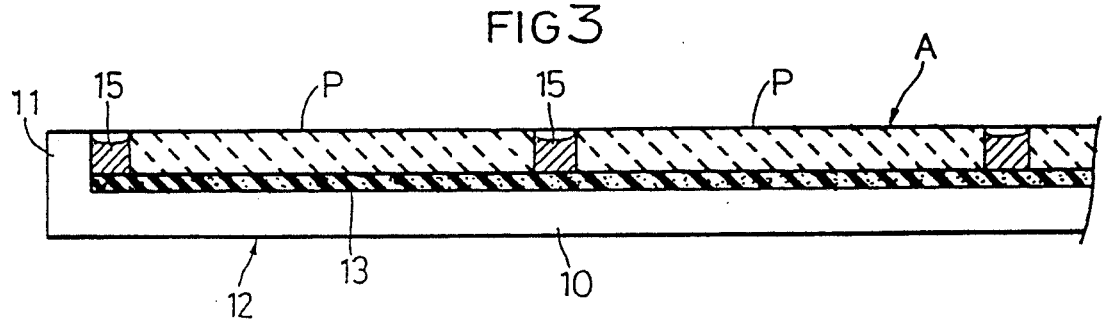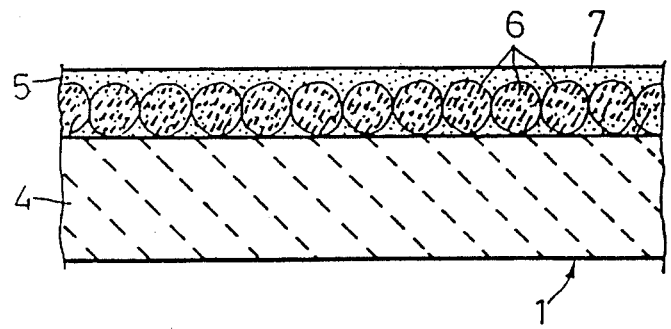

CERAMIC HEATING PLATE

BACKGROUND AND SUMMARY OF THE INVENTION

The present invention relates to a heating plate of ceramic, and more particularly, to a ceramic heating plate for being built in a panel heater, the heating plate generating far-infrared rays at an elevated temperature.

As is generally known, there is a ceramic known in the art as generating far-infrared rays when it becomes heated. Such ceramics are recently used as a source of energy for a variety of purposes.

A well-known application is a concealed heating system in which a number of heating plates are built in floors and walls of a building. An advantage of the ceramic heating plates is that they warm the rooms by radiation of heat. Radiation heats objects rather than air so that heat loss due to convection (which causes a higher temperature near the ceiling then at the floor) is greatly reduced. Also radiation phenomena is a lesser user of energy than convection phenomena for transference of heat. The far-infrared rays has a good permeability of heat through a human body, and even if the entire room temperature is low on a thermometer, the receivers of heat feel sufficiently warm. This is the reason why the far-infrared rays save energy.

In general, to generate far-infrared rays alumina is used to make heating plates, because alumina is relatively easy to procure and inexpensive, and also easy to produce a smooth planar surface. However, the problem is that the ceramic substratum must contain a special ceramic capable of generating far-infrared rays of a required wavelength. To satisfy this requirement, the plates become thick and heavy. The thick and heavy heating plates lead to a thick and heavy panel heater. In addition, the thick plates take time to become heated, thereby increasing the consumption of electricity.

The present invention is directed toward an improved ceramic heating plate, which solves the problems discussed above with respect to the known ceramic far-infrared ray plates. Thus an object of the present invention is to provide a thin and lightweight ceramic heating plate without trading off the efficiency of generating far-infrared rays.

This object is achieved by providing a ceramic heating plate which comprises a planar body including a ceramic substratum covered with a far-infrared ceramic layer on its top surface; a heating sheet attached to the back surface of the substratum, the heating sheet including a pair of lead terminals through which the heating plate is connected to a source of power; and wherein the ceramic layer contains ceramic particles exposed above the surface thereof so that far-infrared rays are radiated outside directly therefrom.

Other objects and advantages of the present invention will become more apparent from the following detailed description, when taken in conjunction with the accompanying drawings which show, for the purpose of illustration only, one embodiment in accordance with the present invention.

DETAILED DESCRIPTION OF THE DRAWINGS

FIG. 1 is a vertical cross-section through a heating plate according to the present invention;

FIG. 1A shows an enlargement of that portion of the plate of FIG. 1 that is enclosed by a circle;

FIG. 3 is a vertical cross-section through a panel heater constituted by an assembly of the heating plates of FIG. 1; and FIG. 4 is a vertical cross-section showing an example of embodiment for comparison.

DETAILED DESCRIPTION OF THE INVENTION

Figure 2:
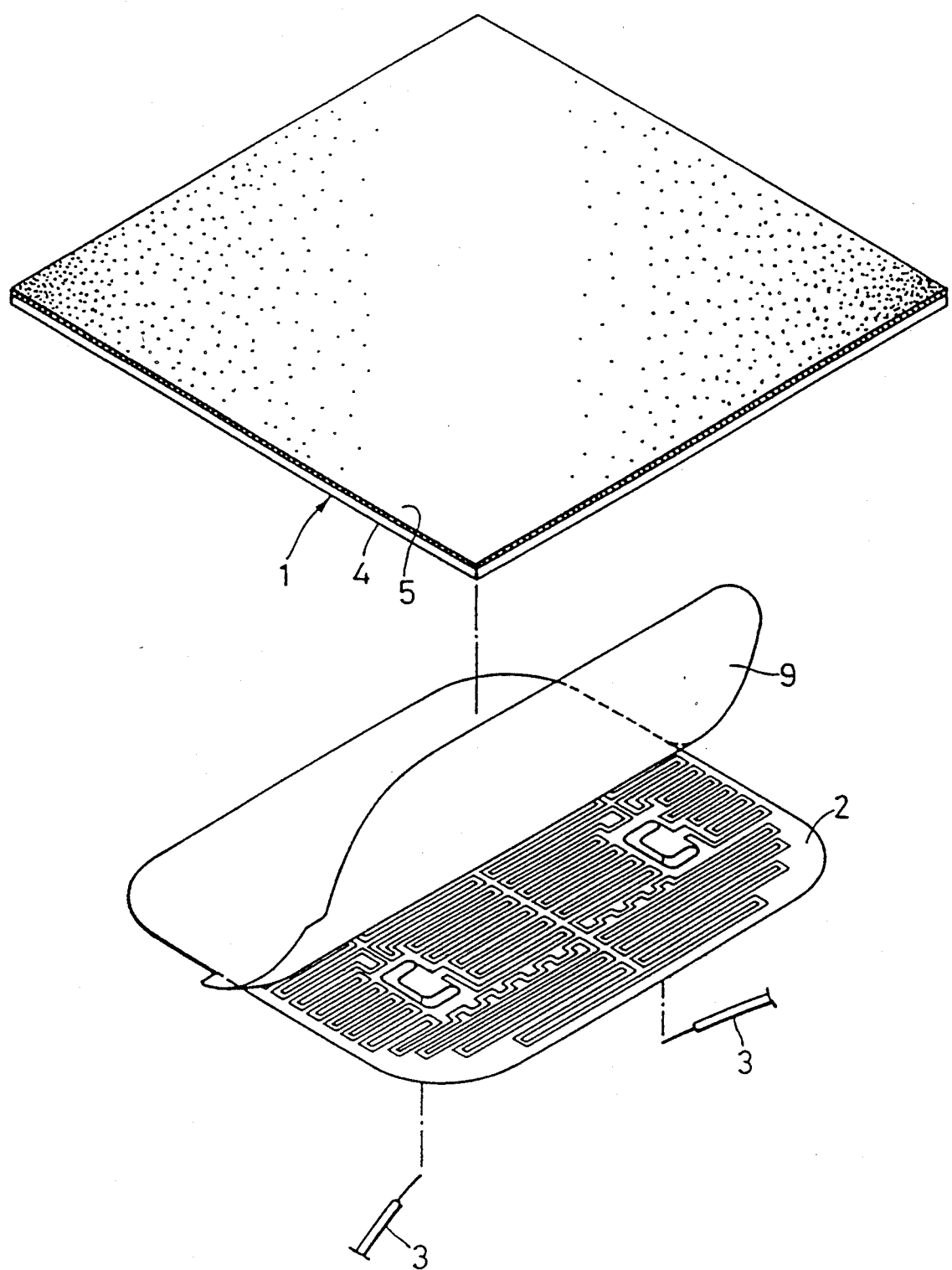
FIG. 2 is an analytical perspective view showing the heating plate of FIG. 1.

Referring to FIGS. 1 and 2 there is provided a heating plate (P), which comprises a planar body 1 and a heating sheet 2. The planar body 1 comprises a ceramic substratum 4, and a far-infrared ray ceramic layer 5. As shown in FIG. 1, the ceramic layer 5 contains ceramic particles 6 whose top portions are exposed. The heating sheet 2 is connected to another heating plate (P) through terminals 3 thereof, which will be described in greater detail below.

The planar body 1 is fabricated as follows:

96% of alumina and 4% of silica are mixed together, and the mixture is sintered in a known manner. At this stage the thickness of the substratum 4 can be determined as desired, which means that the final heating plate (P) can have a desired thickness. Then it is coated with a glaze of glass and ceramic powder (e.g. iron oxide) by means of a brush or a spray gun. The coated substratum 4 is again sintered at 600° to 1200° C. In this way the substratum 4 is glazed with the ceramic layer 5, in which, as shown in FIG. 1A a glass layer 7 sinks and the ceramic particles 6 are exposed above it. The planar body 1 is normally square with sides of 10 cm and a thickness of 0.7 mm. The ceramic layer 5 is 1/10 times as thick as the substratum 4. In one embodiment the substratum 4 was 0.635 mm thick, and the ceramic layer 5 was 0.065 mm thick.

The heating sheet 2 comprises a heating element coated with a heat-proof adhesive 8, which is covered with a releasable sheet 9. When the heating sheet 2 is to be attached to the planar body 1, the releasable sheet 9 is removed, and the adhesive layer 8 is adhered to the ceramic substratum 4. The terminals 3 are led out for electrical connection to another heating plate (P).

Referring to FIG. 3, the assemblage of heating plates (P) into a panel heater (A) is conducted as follow:

A required number of heating plates (P) are placed side by side in a framework 12 having a bottom 3 and side walls 11 with an insulting board 13 interposed on the bottom 10. The heating plates (P) are electrically connected to one after another through the respective terminals 3, wherein the connected terminals 3 are sealed by a sealing substance 15. The framework 12, the insulating board 13 and the heating plates (P) are jointed to each other in a known manner so as to form an entity.

The panel heater (A) is concealed in floors of a building. Because of the relatively thin heating plates (P) (normally 0.7 mm thick) the ceramic layers 5 quickly become heated. Since the top portions of the ceramic particles 6 project above the surface of the layer 5, the far-infrared rays are directly radiated therefrom. This will be better understood by comparison with the example shown in FIG. 4, where the ceramic particles 6 are completely concealed in the glass layer 7, thereby radiating far-infrared rays through the glass layer 7.

Experiments have demonstrated that the panel heater (A) produces a comfortable warm atmosphere with the temperature being 27° to 30° C. near the floor, and the room temperature being 16° to 18° C. No appreciable differences in temperature were recognized between the floor and the ceiling.

The panel heater (A) is built in walls and/or ceilings. Alternately, it can be built in a standard, which is positioned in place in a room. The heating plate (P), the heating sheet 2 and the terminals 3 can be united immediately before the heating panels are assembled into a panel heater (A).

The far-infrared ray layer can be made of matallic oxides (e.g. iron oxide, manganese oxide, copper oxide, cobalt oxide, alumina, calsia, magnesia, zirconia, cordierite), carbonized oxides or nitrated oxides or a composite of these.

What is claimed is:

1. A ceramic heating plate comprising:
   a planar body including a ceramic substratum sintered together with a far-infrared ceramic layer on the top surface thereof; and
   means for heating said substratum;
   wherein said far infrared ceramic layer contains a single layer of ceramic particles which emit far infrared radiation when heated, each of said particles being in contact with said ceramic substratum and also having an area exposed at the outside surface of said far infrared ceramic layer so that far infrared rays are radiated outside directly from the exposed areas of the particles.

2. A ceramic heating plate as defined in claim 1, wherein said means for heating comprises a heating sheet attached to said substratum, said heating sheet having a pair of lead terminals through which the heating plate is connected to a source of power.

3. A ceramic heating plate as defined in claim 1, wherein said heating plate has a thickness of 0.6 to 15 mm.

* * * * *